(12) United States Patent
Chen et al.

(10) Patent No.: US 8,773,104 B2
(45) Date of Patent: Jul. 8, 2014

(54) ON-TIME CONTROL MODULE AND ON-TIME CONTROL METHOD FOR COMPENSATING SWITCHING FREQUENCY IN SWITCHING REGULATOR

(75) Inventors: Chih-Yuan Chen, Hsinchu (TW); Liang-Hsiang Chiu, Hsinchu County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 274 days.

(21) Appl. No.: 13/225,479

(22) Filed: Sep. 4, 2011

(65) Prior Publication Data
US 2012/0280671 A1 Nov. 8, 2012

(30) Foreign Application Priority Data
May 4, 2011 (TW) .............................. 100115649 A (51) Int. Cl.
*G05F 5/00* (2006.01)
*G05F 1/00* (2006.01)

(52) U.S. Cl.
USPC .......................................... 323/303; 323/271

(58) Field of Classification Search
USPC ................................................... 323/299, 303
See application file for complete search history.

(56) References Cited

U.S. PATENT DOCUMENTS

| 5,717,578 | A  | * | 2/1998 | Afzal | ........................... | 320/111 |
| 8,059,432 | B2 | * | 11/2011 | Kraft | ......................... | 363/56.11 |
| 8,120,347 | B1 | * | 2/2012 | Cao | ............................... | 323/285 |
| 2009/0103338 | A1 | * | 4/2009 | Nakamura | ....................... | 363/89 |
| 2009/0243551 | A1 | * | 10/2009 | Pai et al. | ........................ | 320/159 |
| 2011/0316508 | A1 | * | 12/2011 | Cheng et al. | ................... | 323/282 |

FOREIGN PATENT DOCUMENTS

TW 200736874 10/2007

* cited by examiner

*Primary Examiner* — Adolf Berhane
*Assistant Examiner* — Emily P Pham
(74) *Attorney, Agent, or Firm* — Winston Hsu; Scott Margo (57) ABSTRACT

The present invention discloses an on-time control module for compensating a switching frequency in a switching regulator. The on-time control module includes an average voltage generating circuit, for generating an average voltage related to a duty according to an input voltage and the duty, and an on-time controller, for generating a control signal of an on-time related to the duty according to the input voltage and the duty voltage.

8 Claims, 9 Drawing Sheets

ON-TIME CONTROL MODULE AND ON-TIME CONTROL METHOD FOR COMPENSATING SWITCHING FREQUENCY IN SWITCHING REGULATOR

BACKGROUND OF THE INVENTION

1. Field of the Invention

The present invention relates to an on-time control module and an on-time control method, and more particularly, to an on-time control module and on-time control method for compensating and stabilizing a switching frequency.

2. Description of the Prior Art

Power supply related devices are a crucial part in modern information technology. Among all kinds of power supply devices, DC-DC switching regulators have gained wide popularity, and a main function of the DC-DC switching regulators is to provide a stable direct current (DC) power to electronic components.

Figure 1:
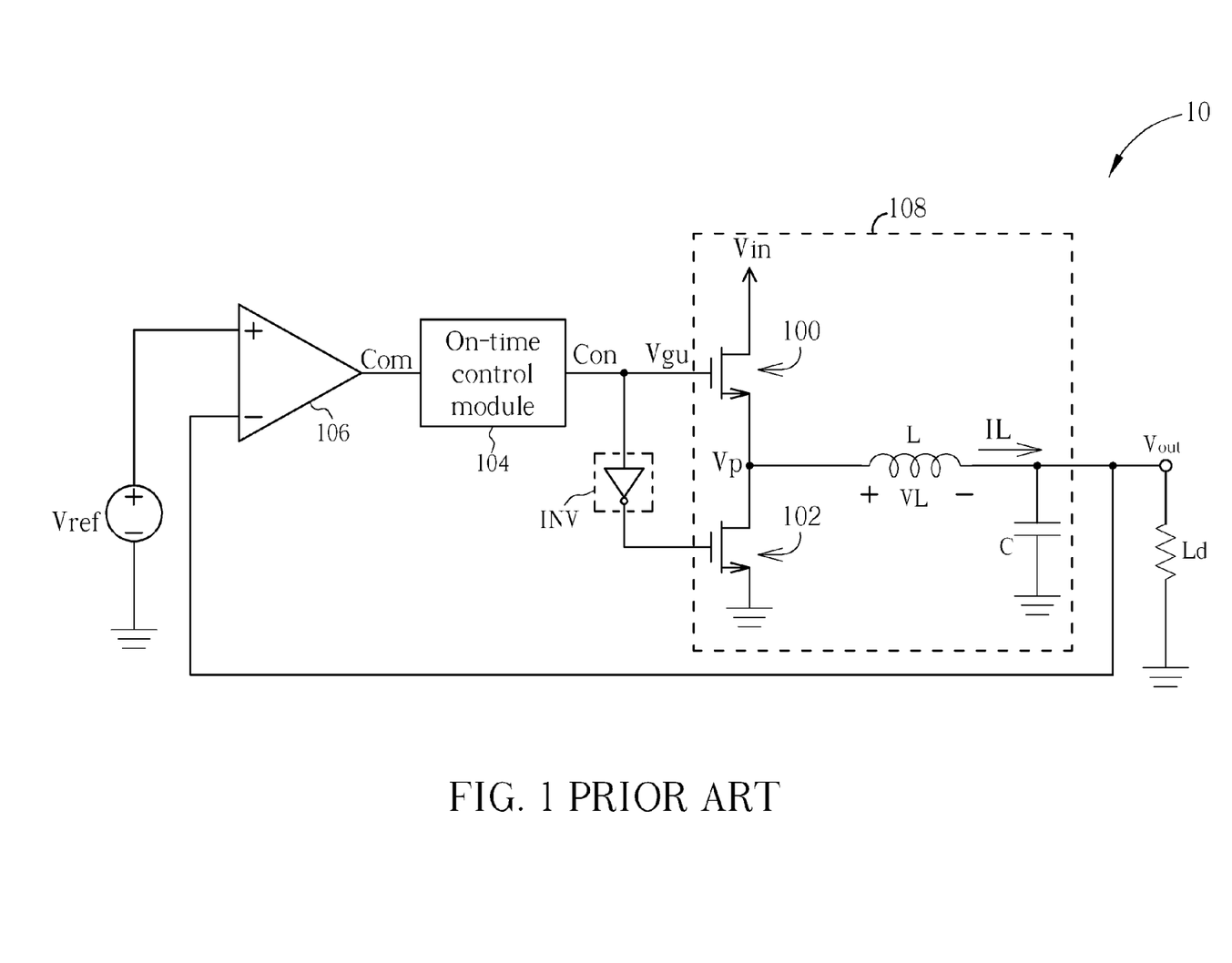
FIG. 1 is a schematic diagram of a DC-DC switching regulator with fixed on-time according to the prior art.

Please refer to FIG. 1, which is a schematic diagram of a fixed on-time DC-DC switching regulator 10 according to the prior art. The DC-DC switching regulator 10 provides a stable output voltage Vout to a load Ld, and includes an upper-gate switch 100, a lower-gate switch 102, an on-time control module 104, a comparator 106, an inductor L, a capacitor C and an invertor INV. The upper-gate switch 100, the lower-gate switch 102, the inductor L and the capacitor C form a power-stage circuit 108 to output the output voltage Vout to the load Ld. The on-time control module 104 outputs a control signal Con with an on-time Ton to control on/off operations of the upper-gate switch 100 and the lower-gate switch 102.

In short, whenever the output voltage Vout is lower than a reference voltage Vref, the comparator 106 would output a high-level comparison result Com to control the on-time control module 104 to trigger an on-time Ton in the control signal Con (during which the control signal Con is at the high-level), so as to turn on the upper-gate switch 100 and turn off the lower-gate switch 102. This in turn causes a system voltage Vin to transfer electric power to the inductor L via the upper-gate switch 100, outputting a load charging current IL to charge the capacitor C. As a result, the output voltage Vout (a voltage across the capacitor C) outputted to the load Ld increases until the output voltage Vout becomes greater than the reference voltage Vref, at which point the comparison result Com switches to a low level. Next, after the on-time Ton, the control signal Con switches back to the low-level, causing the upper-gate switch 100 to cut off and the lower-gate switch 102 to conduct, such that the output voltage Vout starts to decrease until it becomes lower than the reference voltage Vref. Then, the above-mentioned process is repeated. As such, the DC-DC switching regulator 10 is capable of controlling the on/off operation of the upper-gate switch 100 with a stable switching frequency $F_{sw}$, thereby regulating the electric power transmitted to the load Ld and maintaining stability in the output voltage Vout.

Moreover, the DC-DC switching regulator 10 often further includes a pulse width modulation (PWM) circuit, which is capable of modulating the control signal Con according to a configured duty D, to obtain the desired switching frequency $F_{sw}$. In more detail, please refer to FIGS. 2A and 2B, which are schematic diagrams of the load current IL and a voltage VL of the inductor L shown in FIG. 1 under ideal conditions. Under the ideal conditions, assuming that the upper-gate switch 100 and the lower-gate switch 102 have negligible conduction resistances when turned on, and that the load current IL has equal rising and lowering amplitudes, it is possible to obtain a relationship (Vin−Vout)*D*$T_S$=Vout*(1−D)*$T_S$, and therefore $$D = \frac{Vout}{Vin}.$$

Figure 2A:
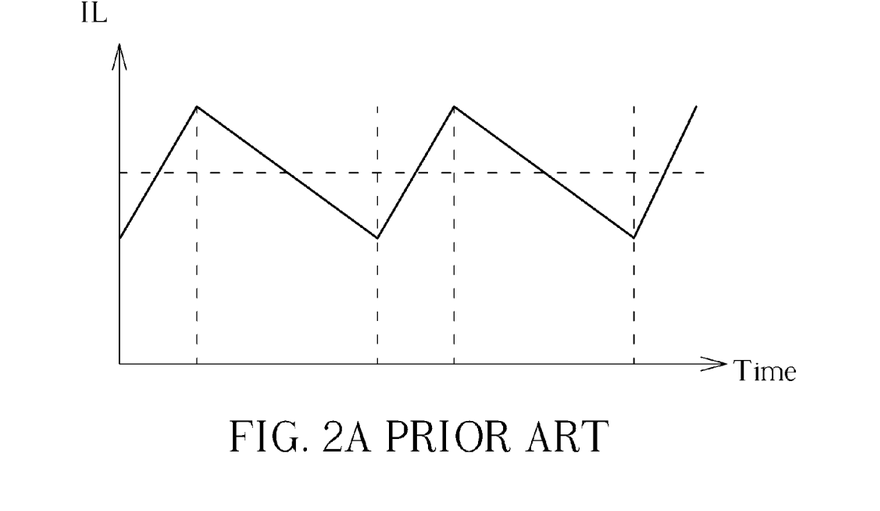
FIGS. 2A and 2B are waveform diagrams of a current and a voltage of an inductor shown in FIG. 1 under ideal conditions.
Figure 2B:
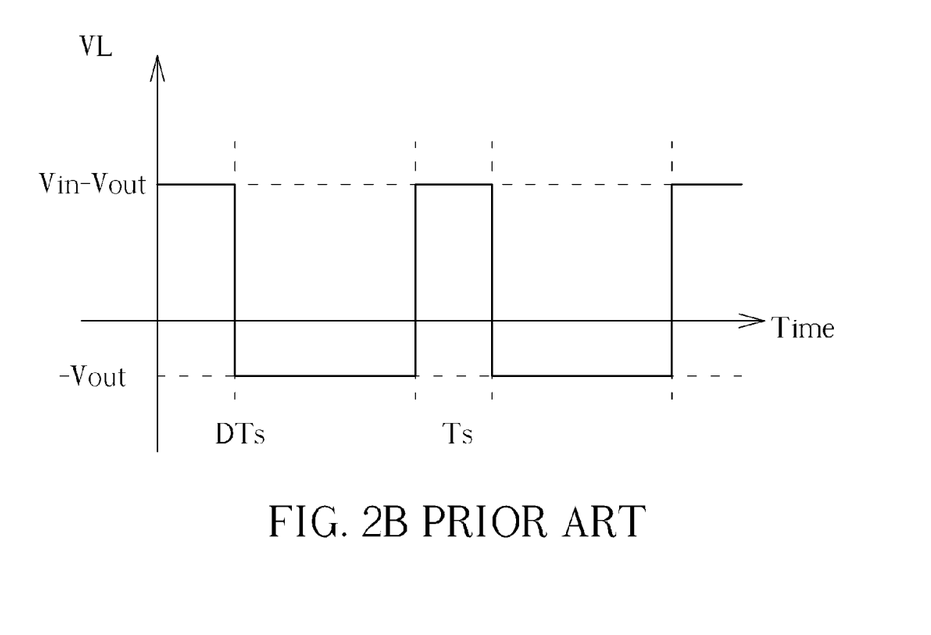

Under actual and non-ideal conditions, assuming that the upper-gate switch 100 and the lower-gate switch 102 have an equal conduction resistance Rds, and that the load current IL has equal rising and lowering amplitudes, the following may be obtained:

[(Vin−IL*Rds)−Vout]*D*$T_S$=(Vout+IL*Rds)*(1−D), and therefore $$D = \frac{V_{out} + IL * Rds}{V_{in}}.$$

Under this condition, $$Ton = \frac{1}{F_{sw}} * D,$$

and therefore if the on-time Ton is constant, then the duty D may be suitably configured to obtain the required switching frequency $F_{sw}$.

However, in reality, when the on-time control module 104 triggers the on-time Ton in the control signal Con, a length of the on-time Ton also varies under an effect of the load current IL and the conduction resistance Rds. Therefore, a fixed on-time Ton cannot be obtained with a fixed duty D to stabilize the switching frequency $F_{sw}$. Namely, the switching frequency $F_{sw}$ would vary according to the load current IL and the conduction resistance Rds.

To stabilize the switching frequency $F_{sw}$, the conventional DC-DC switching regulator 10 further includes a feedback compensation unit coupled between the control signal Con and the on-time control module 104, for performing integration operation on the control signal Con, and then comparing the integration result with a reference voltage to adjust the length of the on-time Ton of the on-time control module 104, so as to stabilize the switching frequency $F_{sw}$. However, this method requires a large capacitor in the feedback compensation unit for performing the integration operation, resulting in an excessive circuit layout area. Hence, it is necessary to improve over the prior art.

SUMMARY OF THE INVENTION

Therefore, a primary objective of the present invention is to provide an on-time control module and an on-time control method capable of compensating and stabilizing a switching frequency.

An on-time control module for compensating a switching frequency in a switching regulator is disclosed. The on-time control module comprises an average duty voltage generating circuit, for generating an average duty voltage related to a duty according to an input voltage and the duty; and an on-time controller, for generating a control signal having an on-time related to the duty according to the input voltage and the average duty voltage.

An on-time control method for compensating a switching frequency in a switching regulator is disclosed. The on-time control method comprises generating an average voltage related to a duty according to an input voltage and the duty; and generating a control signal having an on-time related to the duty according to the input voltage and the duty voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 3A:
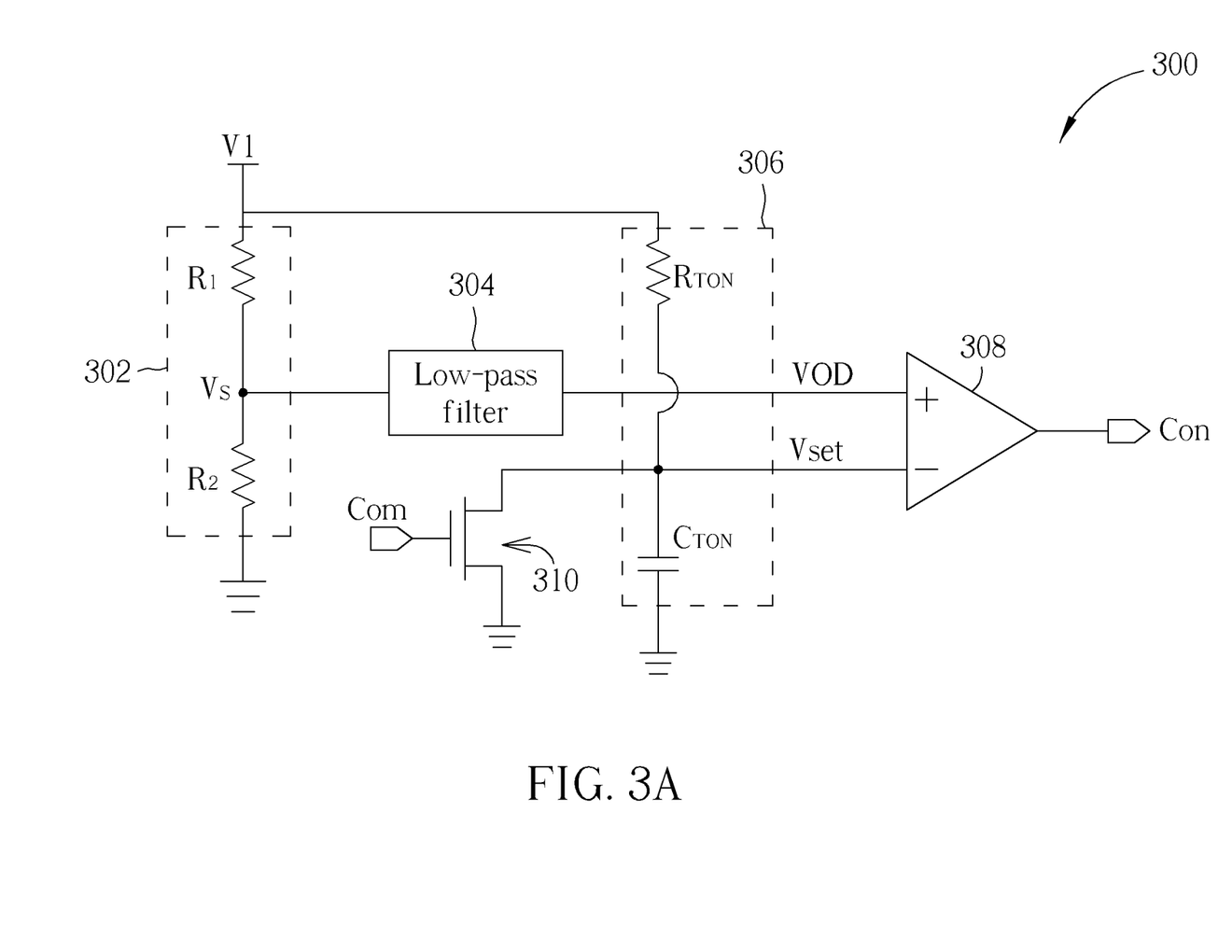
FIG. 3A is a schematic diagram of an on-time control module for implementing an on-time control module shown in FIG. 1.

Please refer to FIG. 3A, which is a schematic diagram of an on-time control module 300 for implementing the on-time control module 104 shown in FIG. 1. As shown in FIG. 3A, the on-time control module 300 includes a voltage-dividing circuit 302, a low-pass filter 304, a resistor-capacitor (RC) circuit 306, a comparator 308, and a discharge switch 310. In short, the voltage-dividing circuit 302 generates a divided voltage Vs according to an input voltage V1, such that the low-pass filter 304 may perform averaging on the divided voltage Vs to generate an average voltage VOD for a positive input terminal of the comparator 308; the input voltage V1 can charge a capacitor $C_{Ton}$ in the resistor-capacitor circuit 306 to generate an on-time setting voltage Vset for a negative input terminal of the comparator 308. As such, the comparator 308 may compare the average voltage VOD with the on-time setting voltage Vset to generate a control signal Con having an on-time Ton.

Figure 3B:
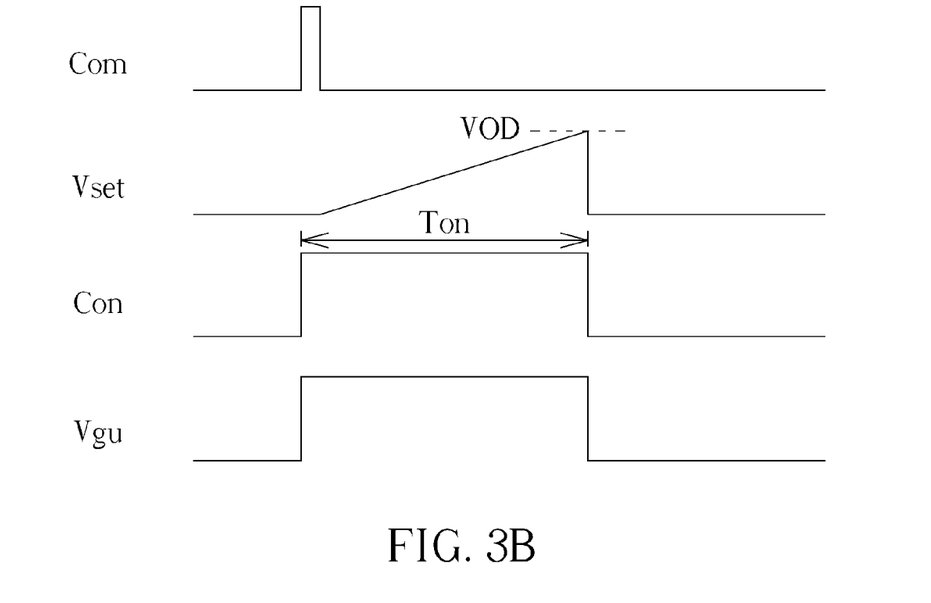
FIG. 3B is a waveform diagram of a comparison result, an on-time setting voltage, a control signal, and a gate voltage of an upper-gate switch.

In more detail, please refer to FIG. 3B, which is a waveform diagram of the comparison result Com, the on-time setting voltage Vset, the control signal Con, and a gate voltage Vgu of the upper-gate switch 100. As shown in FIG. 3B, when the output voltage Vout is lower than the reference voltage Vref, the comparison result Com switches to the high level, such that the discharge switch 310 discharges the on-time setting voltage Vset to zero. The comparator 308 determines that the average voltage VOD is higher than the on-time setting voltage Vset and starts to trigger the control signal Con to the high level. Next, the input voltage V1 starts to charge the capacitor $C_{Ton}$, such that the on-time setting voltage Vset starts to rise until it equals the average voltage VOD, at which point the comparator 308 stops triggering the control signal Con to the high level.

In other words, a time for the on-time control module 300 to trigger the on-time Ton in the control signal Con equals that for the input voltage V1 to charge the voltage across the capacitor $C_{Ton}$ (i.e. the on-time setting voltage Vset) from zero to the average voltage VOD. As an example, suppose the input voltage V1 is a phase voltage Vp at an intersection between the upper-gate switch 100 and the lower-gate switch 102, i.e.

$$Ton = \frac{C_{TON} * VOD}{Vin - IL * Rds} * R_{TON},$$

wherein the average voltage VOD is not perfectly correlated to the duty D and therefore the on-time Ton is not perfectly correlated to the duty D.

Figure 3C:
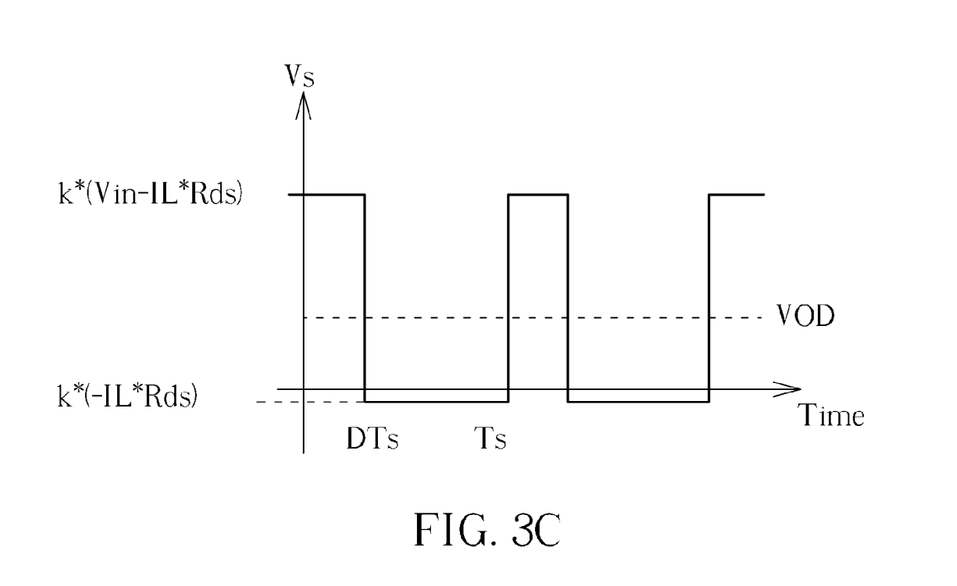
FIG. 3C is a waveform diagram of a divided voltage and an average voltage when an input voltage is a phase voltage.

In more detail, please refer to FIG. 3C, which is a waveform diagram of the divided voltage Vs and the average voltage VOD when the input voltage V1 is the phase voltage Vp, wherein $k=R_2/(R_1+R_2)$. In such a case, the average voltage VOD may be obtained via the following:

$$VOD = \frac{1}{Ts} \int_0^{Ts} V_S(t)dt$$
$$= \frac{1}{Ts}[D * Ts * k * (V_{in} - IL * Rds) + (1 - D)Ts * k * (-IL * Rds)]$$
$$= D * k * V_{in} - D * k * IL * Rds - k * IL * Rds + D * k * IL * Rds$$
$$= k * D * V_{in} - k * IL * Rds$$

substituting $$D = \frac{V_{out} + IL * Rds}{V_{in}}$$

into the above for non-ideal conditions, it may be obtained that VOD=k*Vout, and therefore the on-time Ton may be re-written as $$Ton = \frac{C_{TON} * k * V_{out}}{Vin - IL * Rds} * R_{TON}.$$

As can be known from the above expression, the average voltage VOD is not perfectly correlated to the duty D, but varies with the load current IL and the conduction resistance Rds. As a result, the on-time Ton is not perfectly correlated with the duty D but also varies with the load current IL and the conduction resistance Rds. Therefore, when implementing the on-time control module 104 shown in FIG. 1 with the on-time control module 300, it is not possible for the DC-DC switching regulator 10 to obtain a constant on-time Ton using a constant duty D, and therefore the switching frequency $F_{sw}$ cannot be stabilized. Namely, the switching frequency $F_{sw}$ would vary with the load current IL and the conduction resistance Rds.

Figure 4A:
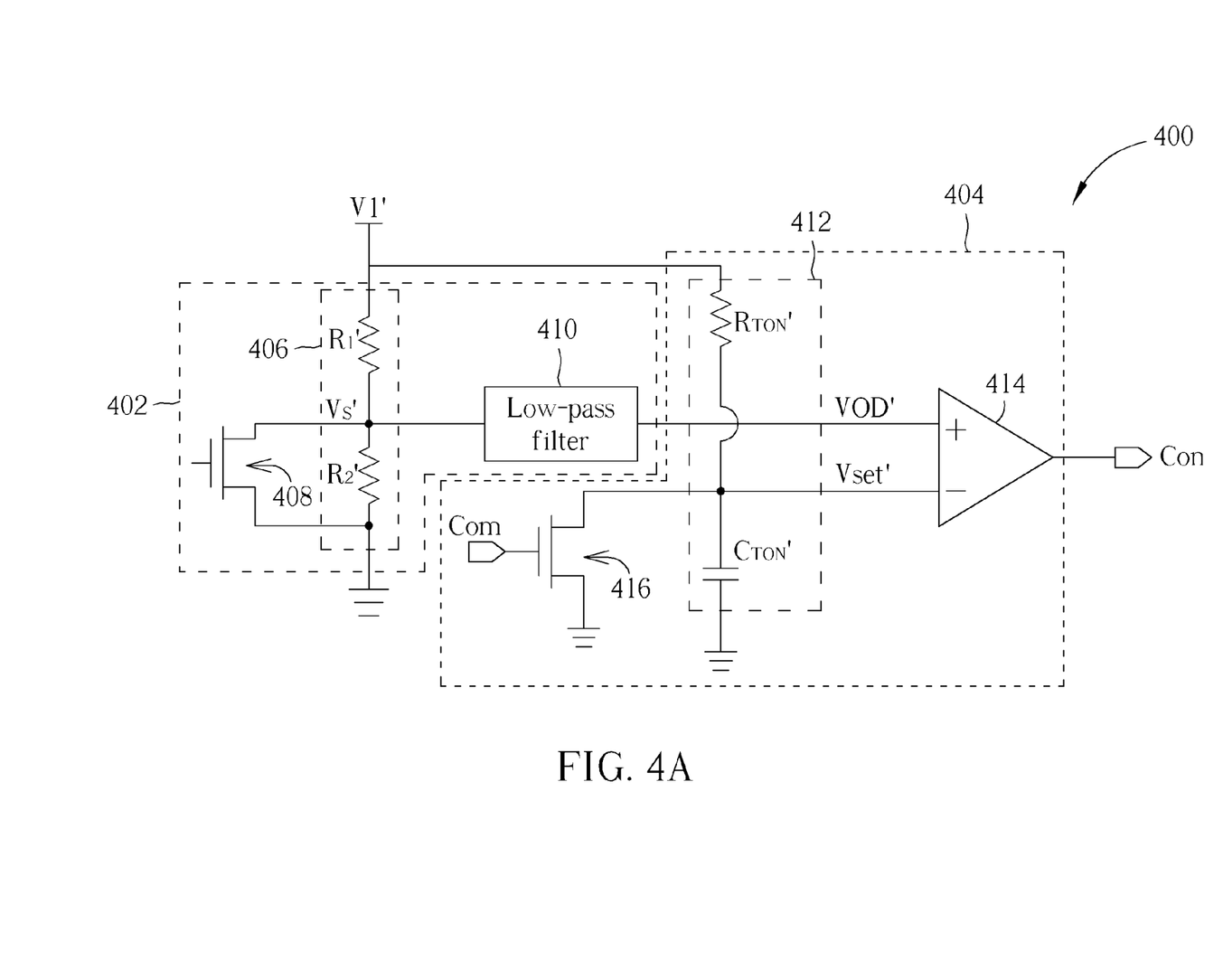
FIG. 4A is a schematic diagram for an on-time control module for implementing the on-time control module shown in FIG. 1 according to an embodiment of the present invention.

Please refer to FIG. 4A, which is a schematic diagram of an on-time control module 400 for implementing the on-time control module 104 shown in FIG. 1 according to an embodiment of the invention. As shown in FIG. 4A, the on-time control module 400 includes an average voltage generating circuit 402 and an on-time controller 404. In short, the average voltage generating circuit 402 generates an average voltage VOD' related to the duty D according to an input voltage V1' and the duty D. The on-time controller 404 generates a control signal Con having an on-time Ton related to the duty D according to the input voltage V1' and the average voltage VOD'. As such, since the average voltage VOD' is related to the duty D, and the on-time Ton generated according to average voltage VOD' is also related to the duty D, when implementing the on-time control module 104 shown in FIG. 1 with the on-time control module 400, the DC-DC switching regulator 10 can obtain a fixed on-time Ton using a fixed duty D, thereby stabilizing the switching frequency $F_{sw}$. Namely, the switching frequency $F_{sw}$ would not vary with the load current IL and the conduction resistance Rds.

In more detail, the average voltage generating circuit 402 includes a voltage-dividing circuit 406, a lower-gate switch 408, and a low-pass filter 410. The voltage-dividing circuit 402 generates a divided voltage Vs' according to the input voltage V1'. The lower-gate switch 408 may conduct when the control signal Con is at low level to pull the divided voltage Vs' down to zero, as with the lower-gate switch 102 shown in FIG. 1, such that the low-pass filter 410 may perform averaging on the divided voltage Vs' to generate the average voltage VOD' related to the duty D. A main distinction between the average voltages VOD' and VOD is that the low-pass filter 304 in the on-time control module 300 performs averaging on both high and low levels of the divided voltage Vs. Therefore, the resulting average voltage VOD contains a component related to the low-level conduction resistance Rds and the load current IL, and is not in perfect correlation with the duty D. Comparatively, the lower-gate switch 408 of the on-time control module 400 conducts and pulls the divided voltage Vs' down to zero when the control signal Con switches to the low level according to the duty D. Accordingly, when the low-pass filter 410 performs averaging on the divided voltage Vs', the averaging is actually only performed on the high level of the divided voltage Vs' (the low level of the divided voltage Vs' being zero), which is related to the duty D. Therefore, the resulting average voltage VOD' is in perfect correlation with the duty D.

On the other hand, the on-time controller 404 includes a resistor-capacitor circuit 412, a comparator 414, and a discharge switch 416. The resistor-capacitor circuit 412 includes a resistor $R_{Ton}'$ and a capacitor $C_{Ton}'$, serially connected between the input voltage V1' and a ground terminal, and charges the capacitor $C_{Ton}'$ via the input voltage V1' to generate an on-time setting voltage Vset'. A negative input terminal of the comparator 414 is coupled to an intersection between the resistor $R_{Ton}'$ and the capacitor $C_{Ton}'$, and receives the on-time setting voltage Vset', whereas a positive input terminal of the comparator 414 receives the average voltage VOD', and compares the on-time setting voltage Vset' with the average voltage VOD' to generate a control signal Con with the on-time Ton related to the duty D.

Figure 4B:
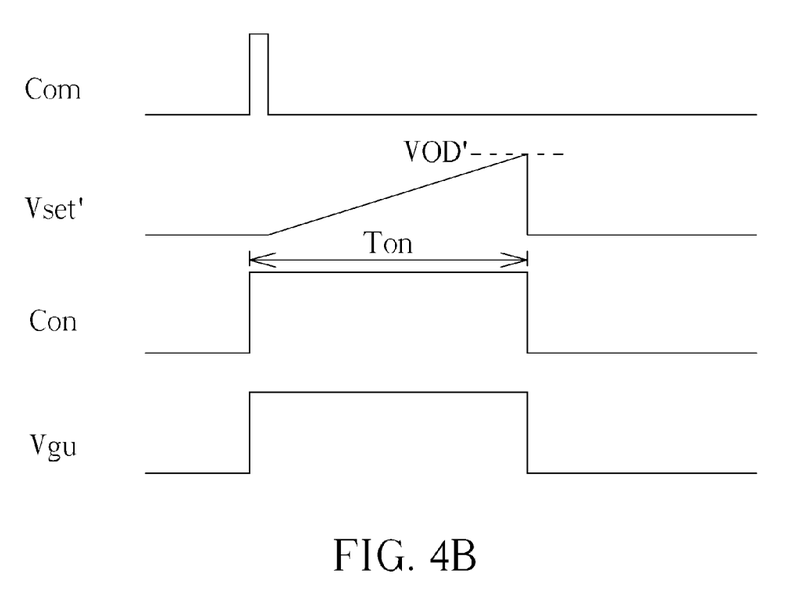
FIG. 4B is a waveform diagram of a comparison result, an on-time setting voltage, a control signal, and a gate voltage of an upper-gate switch according to an embodiment of the present invention.

In more detail, please refer to FIG. 4B, which is a waveform diagram of the comparison result Com, the on-time setting voltage Vset', the control signal Con, and a gate voltage Vgu of the upper-gate switch 100. As shown in FIG. 4B, when the output voltage Vout is smaller than the reference voltage Vref, the comparison result Com switches to the high level, such that the discharge switch 416 discharges the on-time setting voltage Vset' to zero. The comparator 414 determines that the average voltage VOD' is greater than the on-time setting voltage Vset' and starts triggering the control signal Con to the high level. Next, the input voltage V1' starts to charge the capacitor $C_{Ton}'$, such that the on-time setting voltage Vset' increases until it is equal to the average voltage VOD', at which point the comparator 414 stops triggering the control signal Con to the high level.

In other words, the time for the on-time control module 400 to trigger an on-time Ton in the control signal Con equals that for the input voltage V1' to charge a voltage across the capacitor $C_{Ton}'$ (i.e. the on-time setting voltage Vset') from zero to the average voltage VOD'. In an example where the input voltage V1' equals a phase voltage Vp at an intersection between the upper-gate switch 100 and the lower-gate switch 102, i.e.

$$Ton = \frac{C'_{TON} * VOD'}{Vin - IL * Rds} * R'_{TON},$$

wherein the average voltage VOD' is correlated to the duty D and therefore the on-time Ton is also correlated to the duty D.

Figure 4C:
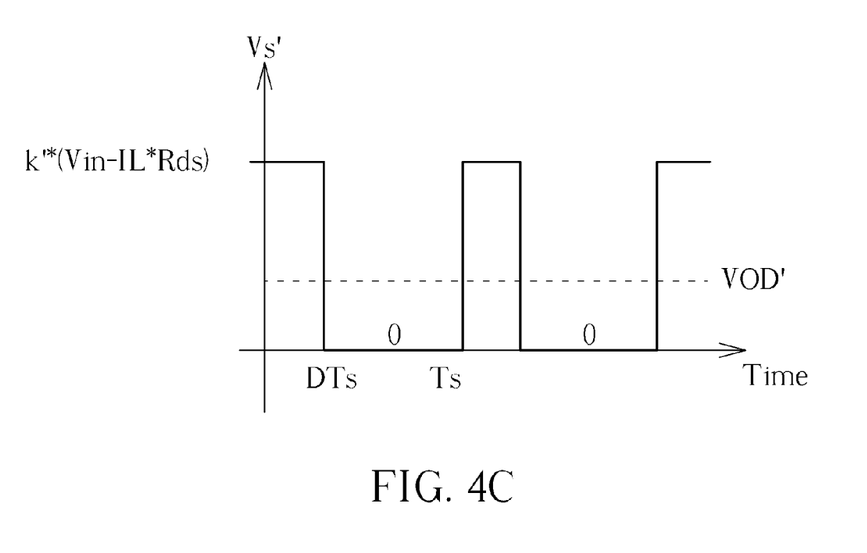
FIG. 4C is a waveform diagram of a divided voltage and an average voltage when an input voltage is a phase voltage, according to an embodiment of the invention.

In more detail, please refer to FIG. 4C, which is a waveform diagram of the divided voltage Vs' and the average voltage VOD' when the input voltage V1' is the phase voltage Vp, wherein k'=$R_2'/(R_1'+R_2')$. In such a case, the average voltage VOD' may be obtained via the following:

$$VOD' = \frac{1}{Ts}\int_0^{Ts} V'_S(t)\,dt$$

$$= \frac{1}{Ts}[D*Ts*k'*(Vin - IL*Rds)]$$

$$= D*k'*(Vin - IL*Rds)$$

Substituting $$D = \frac{V_{out} + IL*Rds}{V_{in}}$$

into the above for non-ideal conditions, it is possible to obtain:

$$VOD' = \frac{Vout + IL*Rds}{Vin} * k' * (Vin - IL*Rds)$$

And therefore the on-time Ton may be re-written as:

$$Ton = \frac{Vout + IL*Rds}{Vin} * k' * (Vin - IL*Rds)\frac{C'_{TON}}{(Vin - IL*Rds)} * R'_{TON}$$

$$= \frac{Vout + IL*Rds}{Vin} * k' * C'_{TON} * R'_{TON}$$

$$= D * k' * C'_{TON} * R'_{TON}$$

As can be known from the above, the average voltage VOD' is correlated to the duty D and does not vary with the load current IL and the conduction resistance Rds when the duty D is fixed, and therefore the on-time Ton is also correlated to the duty D and does not vary with the load current IL and the conduction resistance Rds when the duty D is fixed. Thus, when using the on-time control module 400 to implement the on-time control module 104 shown in FIG. 1, the DC-DC switching regulator 10 is capable of obtaining a fixed on-time Ton through fixing the duty D, thereby stabilizing the switching frequency $F_{sw}$. Namely, the switching frequency $F_{sw}$ only varies with the duty D and does not vary with the load current IL or the conduction resistance Rds.

Figure 5:
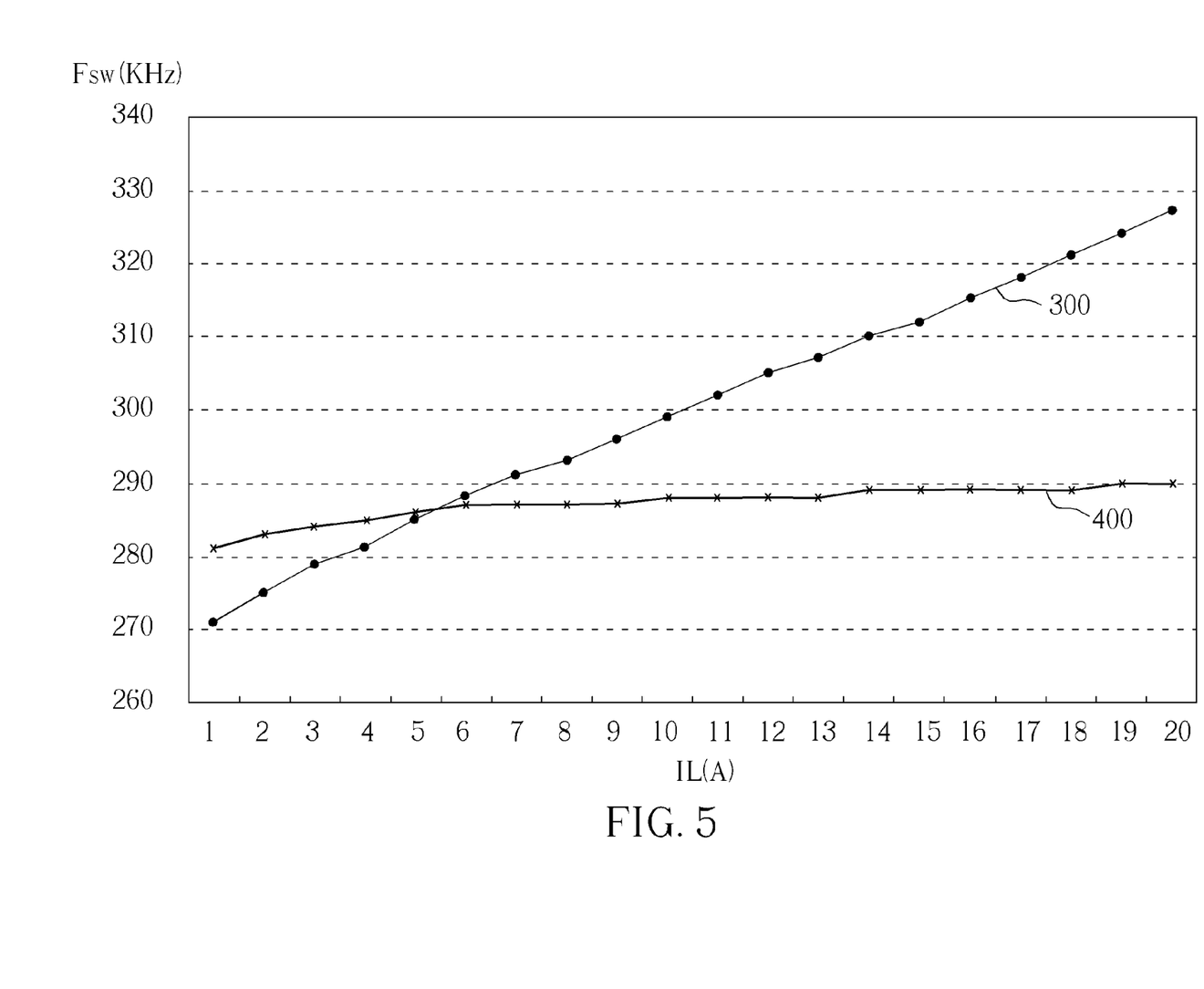
FIG. 5 is a schematic diagram of a switching frequency under different inductor currents when the on-time control module shown in FIG. 1 is implemented with the on-time control module shown in FIGS. 3A and 4A, implemented.

Please refer to FIG. 5, which is a schematic diagram of the switching frequency $F_{sw}$ under different load currents IL when implementing the on-time control module 104 shown in FIG. 1 with the on-time control modules 300 and 400, respectively. As shown in FIG. 5, when implementing the on-time control module 104 shown in FIG. 1 with the on-time control modules 300, the switching frequency $F_{sw}$ has a 20.7% variation under different load currents IL, whereas when implementing the on-time control module 104 shown in FIG. 1 with the on-time control modules 400, the switching frequency $F_{sw}$ has only a 3.1% variation under different load currents IL. As can be seen from the above, the on-time control module 400 is capable of stabilizing the switching frequency $F_{sw}$.

Note that, the spirit of the invention is in generating an average voltage related to the duty, then generating the control signal with an on-time related to the duty according to the average voltage. Therefore, it is possible to obtain a fixed on-time by fixing the duty, thereby stabilizing the switching frequency. Alterations or variations may be made by those skilled in the art accordingly, and are not limited thereto. For example, implementations of the average voltage generating circuit 402 and the on-time controller 404 are not limited to the above-mentioned circuits, providing that it is possible to generate a voltage related to the duty, and to generate a control signal having an on-time related to the duty according to the voltage. Moreover, the input voltage V1' is preferably the phase voltage Vp at the intersection between the upper-gate switch 100 and the lower-gate switch 102. However, the input voltage V1' may also be other voltages related to the system voltage Vin to achieve a better line transient response (i.e. a faster response when the system voltage Vin varies), but may also be any other voltage source and is not limited thereto.

Figure 6:
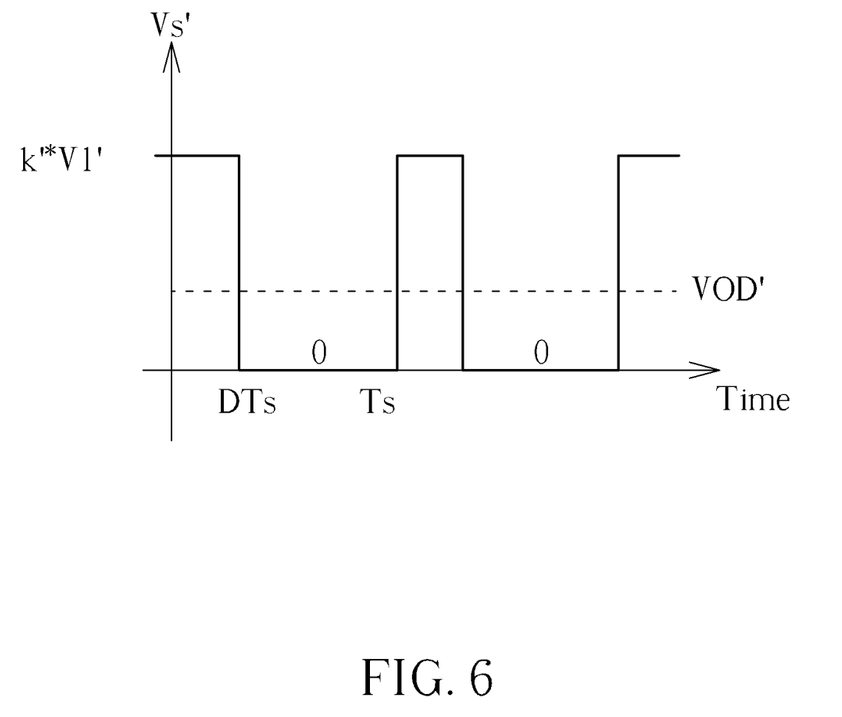
FIG. 6 is a waveform diagram of a divided voltage and an average voltage when an input voltage is an arbitrary voltage source, according to an embodiment of the invention.

In an example where the input voltage V1' is an arbitrary voltage source, i.e.

$$Ton = \frac{C'_{TON} * VOD'}{V1'} * R'_{TON},$$

wherein the average voltage VOD' is also related to the duty D and therefore the on-time Ton is also related to the duty D. In more detail, please refer to FIG. 6, which is a waveform diagram of the divided voltage Vs' and the average voltage VOD' when the input voltage V1' is the arbitrary voltage source according to an embodiment of the invention, wherein $k'=R_2'/(R_2'+R_2')$. In such a case, the average voltage VOD' may be obtained via the following:

$$VOD' = \frac{1}{Ts} \int_0^{Ts} V_S(t) \, dt$$

$$= \frac{1}{Ts} [D * Ts * k' * V1']$$

$$= D * k' * V1'$$

Substituting $$D = \frac{V_{out} + IL * Rds}{V_{in}}$$

into the above for non-ideal conditions, it is possible to obtain:

$$VOD' = \frac{Vout + IL*Rds}{Vin} * k' * V1'$$

And therefore the on-time Ton may be re-written as:

$$Ton = \frac{Vout + IL*Rds}{Vin} * k' * V1' * \frac{C'_{TON}}{V1'} * R'_{TON}$$

$$= \frac{Vout + IL*Rds}{Vin} * k' * C'_{TON} * R'_{TON}$$

$$= D * k' * C'_{TON} * R'_{TON}$$

As can be known from the above, when using the arbitrary voltage source as the input voltage V1' of the on-time control module 400 to implement the on-time control module 104 shown in FIG. 1, the DC-DC switching regulator 10 may also obtain a fixed on-time Ton by fixing the duty D, thereby stabilizing the switching frequency $F_{sw}$. Namely, the switching frequency $F_{sw}$ only varies with the duty D and does not vary with the load current IL or the conduction resistance Rds.

Figure 7:
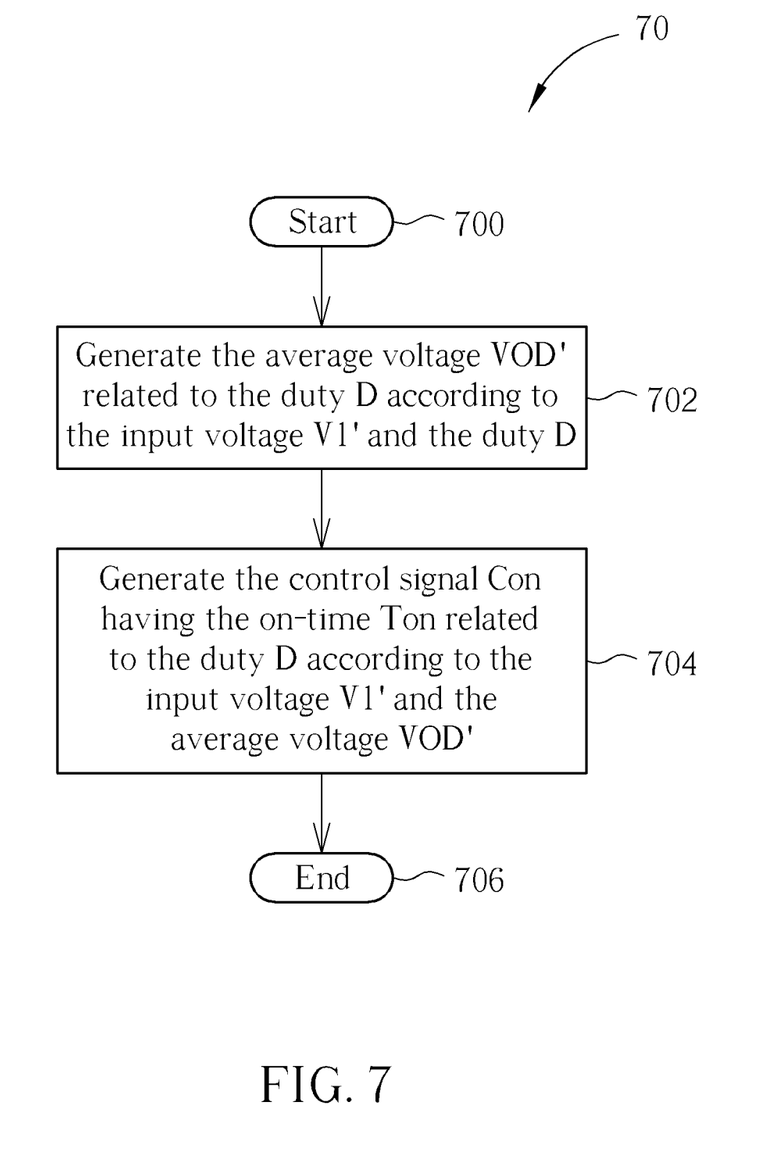
FIG. 7 is a schematic diagram of an on-time control process according to an embodiment of the invention.

Therefore, operations of the on-time control module 400 may be summarized into an on-time control process 70, as shown in FIG. 7. The on-time control process 70 includes the following steps:

Step 700: Start.

Step 702: Generate the average voltage VOD' related to the duty D according to the input voltage V1' and the duty D.

Step 704: Generate the control signal Con having the on-time Ton related to the duty D according to the input voltage V1' and the average voltage VOD'.

Step 706: End.

Details of the on-time control process 70 may be found in the above descriptions of the on-time control module 400, and is not reiterated here.

In the prior art, the length of the on-time Ton varies under influence of the load current IL and the conduction resistance Rds, and therefore it is not possible to obtain a fixed on-time Ton via fixing the duty D to stabilize the switching frequency $F_{sw}$. Adjusting the on-time Ton via the feedback compensation unit requires employing large capacitors to perform integration calculations, which leads to an excessive circuit area. Comparatively, the on-time control module 400 of the invention employs the lower-gate switch 408 to pull the low level voltage of the divided voltage Vs' down to zero, and therefore the average voltage VOD' obtained by the low-pass filter 410 would be correlated to the duty D. The average voltage VOD' is then compared with the on-time setting voltage Vset' obtained by charging the capacitor $C_{Ton}'$ via the input voltage V1' to generate the control signal Con having the on-time Ton related to the duty D. Therefore, it is possible to stabilize the switching frequency $F_{sw}$ by fixing the duty D to obtain the fixed on-time Ton.

In summary, the invention is capable of obtaining a fixed on-time by fixing the duty, thereby stabilizing the switching frequency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An on-time control module, for compensating a switching frequency in a switching regulator, comprising:
   an average voltage generating circuit, for generating an average voltage related to a duty according to an input voltage and the duty; and
   an on-time controller, for generating a control signal having an on-time related to the duty according to the input voltage and the average voltage;
   wherein the average voltage generating circuit comprises:
      a voltage-dividing circuit, for generating a divided voltage according to the input voltage;
      a lower gate switch, having one terminal coupled to the divided voltage and another terminal coupled to a ground, for conducting when the control signal is at a low level to pull the divided voltage down to zero; and
      a low pass filter (LPF), coupled to the divided voltage, for averaging the divided voltage to generate the average voltage related to the duty.

2. The on-time control module of claim 1, wherein the on-time controller comprises:
   a resistor-capacitor (RC) circuit, comprising:
      a resistor, having one terminal coupled to the input voltage; and
      a capacitor, having one terminal coupled to another terminal of the resistor, and another terminal coupled to a ground, for being charged by the input voltage to generate an on-time setting voltage; and
   a comparator, for comparing the on-time setting voltage and the average voltage to generate the control signal having the on-time related to the duty.

3. The on-time control module of claim 2, wherein the on-time controller further comprises a discharge switch, having one terminal coupled to the on-time setting voltage and another terminal coupled to the ground, for conducting when a comparison result is at a high level to discharge the on-time setting voltage to zero.

4. The on-time control module of claim 1, wherein a level of the input voltage equals a level of a phase voltage, a system voltage or a voltage source.

5. An on-time control method for compensating a switching frequency in a switching regulator, comprising:
   generating an average voltage related to a duty according to an input voltage and the duty; and
   generating a control signal having an on-time related to the duty according to the input voltage and the average voltage;
   wherein the step of generating the average voltage related to the duty according to the input voltage and the duty comprises:
      generating a divided voltage according to the input voltage;
      pulling the divided voltage down to zero when the duty controls the control signal to be at a low level; and
      averaging the divided voltage to generate the average voltage related to the duty.

6. The on-time control method of claim 5, wherein the step of generating the control signal having the on-time related to the duty according to the input voltage and the average voltage comprises:
   charging via the input voltage to generate an on-time setting voltage; and
   comparing the on-time setting voltage and the average voltage to generate the control signal having the on-time related to the duty.

7. The on-time control method of claim 6 further comprising:
   discharging the on-time setting voltage to zero when a comparison result is at a high level.

8. The on-time control method of claim 5, wherein a level of the input voltage equals a level of a phase voltage, a system voltage or a voltage source.

* * * * *